US007986299B2

(12) United States Patent
Ota et al.

(10) Patent No.: US 7,986,299 B2
(45) Date of Patent: Jul. 26, 2011

(54) REMOTE CONTROL APPARATUS, REMOTE CONTROL SYSTEM AND DEVICE-SPECIFIC INFORMATION DISPLAY METHOD

(75) Inventors: Motoari Ota, Asaka (JP); Takeshi Misawa, Asaka (JP); Takeshi Miyashita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1130 days.

(21) Appl. No.: 11/715,462

(22) Filed: Mar. 8, 2007

(65) Prior Publication Data

US 2007/0214368 A1 Sep. 13, 2007

(30) Foreign Application Priority Data

Mar. 9, 2006 (JP) ................................. 2006-064734

(51) Int. Cl.
*G09G 5/00* (2006.01)
(52) U.S. Cl. ....................................... 345/156; 348/734
(58) Field of Classification Search .................. 345/156, 345/168, 169, 158; 340/825, 825.57, 825.62, 340/825.69, 426.13–426.15, 222.1; 348/14.05, 348/114, 734, 208.4, 294
See application file for complete search history.

(56) References Cited

U.S. PATENT DOCUMENTS

| | | | |
|---|---|---|---|
| 3,961,851 A | 6/1976 | Gerharz | |
| 5,457,478 A | 10/1995 | Frank | |
| 5,838,250 A | 11/1998 | Maekawa | |
| 5,999,698 A | 12/1999 | Nakai et al. | |
| 6,167,189 A | 12/2000 | Taira et al. | |
| 6,219,488 B1 | 4/2001 | Mori et al. | |
| 6,285,825 B1 | 9/2001 | Miwa et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,415,101 B1 | 7/2002 | deCarmo et al. | |
| 6,762,692 B1 | 7/2004 | Mingot et al. | |
| 7,042,337 B2 | 5/2006 | Borders et al. | |
| 7,068,306 B2 | 6/2006 | Pyle et al. | |
| 7,177,633 B2 | 2/2007 | Ishiwatari | |
| 7,379,664 B2 | 5/2008 | Marcus | |
| 7,626,608 B2 | 12/2009 | Takeda et al. | |
| 7,702,135 B2 | 4/2010 | Hill et al. | |

(Continued)

FOREIGN PATENT DOCUMENTS

CN 1317200 10/2001

(Continued)

OTHER PUBLICATIONS

An "Opt-Navi" System Using a Custom CMOS Image Sensor with a Function of Reading Multiple Region-of-interests.

(Continued)

*Primary Examiner* — Stephen G Sherman
(74) *Attorney, Agent, or Firm* — McGinn IP Law Group, PLLC

(57) ABSTRACT

The present invention relates to a technique for acquiring information specific to a device via an imaging element and performing remote-control of a desired device based on the acquired information specific to the device, and an object thereof is to suspend information display of certain devices in order to suppress disorderliness of a screen and enable remote control of devices to be easily performed. By arranging displaying of the information specific to the device to be suspended according to device state information, the present invention can reduce the risk of remote control being impeded by specific information displayed in an indiscriminant and disordered manner, and efficient remote control operations may be achieved.

14 Claims, 6 Drawing Sheets

U.S. PATENT DOCUMENTS

| | | | |
|---|---|---|---|
| 2001/0053280 A1 | 12/2001 | Yamauchi et al. | |
| 2002/0010589 A1* | 1/2002 | Nashida et al. | 704/275 |
| 2002/0145702 A1 | 10/2002 | Kato et al. | |
| 2003/0118327 A1 | 6/2003 | Um et al. | |
| 2004/0246098 A1 | 12/2004 | Denison et al. | |
| 2005/0035855 A1 | 2/2005 | Sarnowsky | |
| 2005/0206513 A1 | 9/2005 | Fallon | |
| 2007/0070060 A1* | 3/2007 | Kagawa et al. | 345/418 |

FOREIGN PATENT DOCUMENTS

| | | |
|---|---|---|
| EP | 0836183 | 4/1998 |
| EP | 0836189 | 4/1998 |
| EP | 1126454 | 8/2001 |
| JP | 10-40667 | 2/1998 |
| JP | 2000-076197 A | 3/2000 |
| JP | 2000-348442 | 12/2000 |
| JP | 2002-222581 | 8/2002 |
| JP | 2003-32509 | 1/2003 |
| JP | 2003-148740 | 5/2003 |
| JP | 2004-48524 | 2/2004 |
| KR | 1999-22858 | 3/1999 |

OTHER PUBLICATIONS

Proposal of 'OPTO-NAVI' System, which is an information-appliance multi-purpose remote controller using a low power consumption ID-receiving CMOS image sensor having a function of reading a partial area at a high speed (The Journal of the Institute of Image Information and Television Engineers vol. 59, No. 12, pp. 1830-1849 (2005)).

Office Action for U.S. Appl. No. 11/724,301 dated Jun. 14, 2010.

Japanese Office Action dated Oct. 12, 2010 with English translation thereof.

Koji Yamamoto et al., "Proposal of 'OPTO-NAVI' System, which is an information-appliance multi-purpose remote controller using a low power consumption ID-receiving CMOS image sensor having a function of reading a partial area at a high speed." The Journal of the Institute of Image Information and Television Engineers, vol. 59, No. 12, pp. 1830-1840, Sep. 2005.

Office Action dated Nov. 26, 2010 (U.S. Appl. No. 11/724,301).

Office Action in U.S. Appl. No. 11/724,301 dated May 5, 2011.

* cited by examiner

REMOTE CONTROL APPARATUS, REMOTE CONTROL SYSTEM AND DEVICE-SPECIFIC INFORMATION DISPLAY METHOD

BACKGROUND OF THE INVENTION

1. Field of the Invention

The present invention relates to a technique for acquiring device-specific information via an imaging element and performing remote-control of a desired device based on acquired device-specific information.

2. Description of the Related Art

In recent years, various techniques have been developed which enable control of a desired device among a plurality of devices using a single controller in an intuitive and readily understood manner. For instance, according to "Proposal of 'OPTO-NAVI' System, which is an information-appliance multi-purpose remote controller using a low power consumption ID-receiving CMOS image sensor having a function of reading a partial area at a high speed" (The Journal of the Institute of Image Information and Television Engineers Vol. 59, No. 12, pp. 1830-1840 (2005)), a custom image sensor mounted on a mobile phone is used to receive an ID from an information appliance while performing real-time capturing of ordinary images. The received ID is superimposed on the captured background image and displayed on a display. A user may perform operations while visually confirming the object device and the device's ID on the display.

SUMMARY OF THE INVENTION

With "Proposal of 'OPTO-NAVI' System, which is an information-appliance multi-purpose remote controller using a low power consumption ID-receiving CMOS image sensor having a function of reading a partial area at a high speed" (hereinafter referred as "non-patent document"), since IDs are displayed even for devices that are substantially inoperable, such as those in sleep mode, the ID displays of other devices are obstructed. An increase in the number of displayed IDs of devices in sleep mode results in the display becoming more disordered, thereby impeding operations and causing image synthesis processing to become cumbersome.

The present invention has been made in consideration of the above problem, and an object thereof is to suspend information display of certain devices in order to suppress disorderliness of a screen and enable remote control of devices to be easily performed.

A remote control apparatus according to the present invention comprises: an acquisition section that continually acquires, by an imaging element, an image in which subject is a remote control target device, information specific to the device that is optically transmitted from the device, and state information of the device; a display section that superimposes the image with the information specific to the device continually acquired by the acquisition section and displays the superimposed image; an instruction acceptance section that accepts, from a user, instructions regarding a selection of information specific to a desired remote control target device among devices for which the information specific to the device has been acquired and a selection of desired control contents regarding the device for which the information specific to the device has been selected; a remote control section that transmits a remote control signal corresponding to the control contents selected at the instruction acceptance section to a device for which the information specific to the device has been selected at the instruction acceptance section; and a display control section that controls the display section so as to suspend superposition/display of the information specific to the device onto the image according to the state information of the device continually acquired by the acquisition section.

Conventionally, since specific information was uniformly superimposed and displayed regardless of the states of devices, selection of a desired control device and control contents was impeded. However, since the present invention arranges displaying of information specific to the device to be suspended according to device state information, the risk of remote control being impeded by the specific information displayed in an indiscriminant and disordered manner may be reduced, and efficient remote control operations may be realized.

The display control section may commence superposition/display of information specific to suspended devices in response to an instruction to the instruction acceptance section.

This allows information to be displayed in response to user operations every time the need arises to perform control, such as turning on power, even for devices for which superposition/display of the specific information is being suspended.

The state information of the device includes information indicating that control of original operations of the device is disabled. Alternatively, the state information of the device includes information indicating that control is either disabled or restricted.

By suspending display of information specific to the device that is in a state in which control of original operations thereof have been restricted, information that is less likely required to be displayed for operations may be erased from the screen, thereby enabling control of original operations of other devices in an easier manner.

A remote control system according to the present invention comprises: a device that optically transmits specific information and state information; an acquisition section that continually acquires, by an imaging element, an image in which subject is the device, information specific to the device that are optically transmitted from the device, and the state information of the device; a display section that superimposes the image with the information specific to the device continually acquired by the acquisition section and displays the superimposed image; an instruction acceptance section that accepts, from a user, instructions regarding a selection of information specific to a desired remote control target device among devices for which the information specific to the device has been acquired and a selection of desired control contents regarding the device for which the information specific to the device has been selected; a remote control section that transmits a remote control signal corresponding to the control contents selected at the instruction acceptance section to a device for which for the information specific to the device has been selected at the instruction acceptance section; and a display control section that controls the display section so as to suspend superposition/display of the information specific to the device onto the images according to the state information of the device continually acquired by the acquisition section.

A device-specific information display method according to the present invention comprises steps for: continually acquiring, by an imaging element, an image in which subject is a remote control target device, information specific to the device that is optically transmitted from the device, and state information of the device; superimposing the image with the information specific to the device continually acquired by the acquisition section and displaying the superimposed image; and controlling the display section so as to suspend superposition/display of the information specific to the device onto the image according to the state information of the device continually acquired.

By arranging displaying of the information specific to the device to be suspended according to state information of the device, the present invention may reduce the risk of remote control being impeded by specific information displayed in an indiscriminant and disordered manner, and efficient remote control operations may be achieved.

DETAILED DESCRIPTION OF THE PREFERRED EMBODIMENTS

Figure 1:
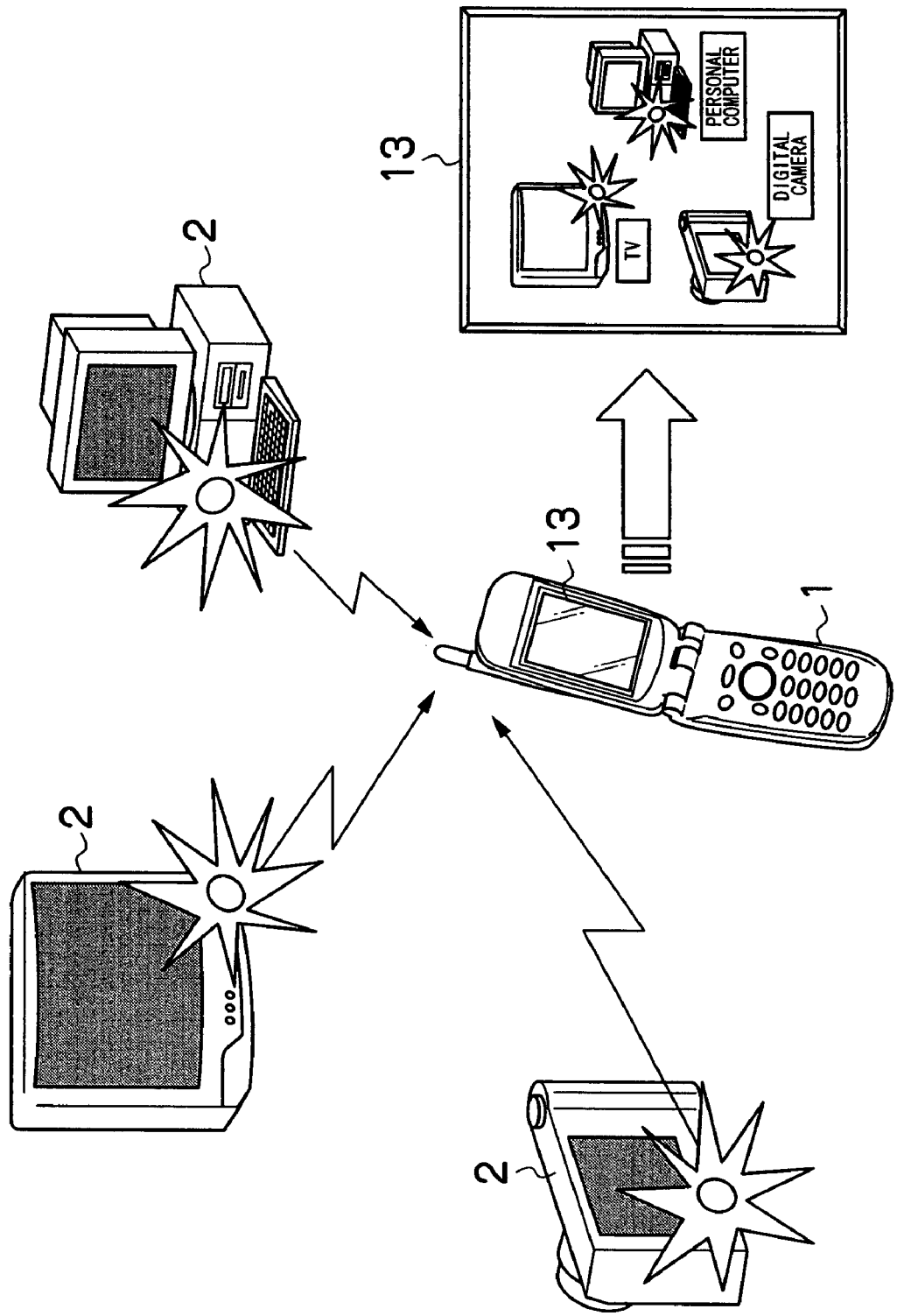
FIG. 1 is a configuration diagram of a remote control system.

FIG. 1 is a schematic configuration diagram of a remote control system according to a preferred embodiment of the present invention. The system comprises a remote control apparatus 1, and other devices 2 which may be an AV device controlled by the remote control apparatus 1 such as a television, video, stereo, or a personal computer, a cooking appliance and the like. The remote control apparatus 1 connects to each of the devices 2 via an external network such as a mobile communication network or the Internet, or a local area network (LAN).

When all operations of a device 2 is remote-controllable (for instance, when the main power of the device 2 is turned on), the device 2 superimposes a low-frequency pilot signal for notifying its own information transmission position onto device-specific information that is information specific to the device (this information may be an identification number, an ID, a serial number, a manufacturer number, a model number, a model of the device 2, an address on an external network, or any other information that is specific to the device 2), and continually transmits this information by means of optical signals such as infrared.

In a sleep state, the device 2 also superimposes sleep information indicating that the device is in a sleep state onto the low-frequency pilot signal in addition to the device-specific information, and continually transmits the information. As used herein, a sleep state indicates a state that is achieved by, for instance, turning on power in response to a power-on by a remote control signal, in which minimal functions required for activating the device 2 are operational but control of the original operations of the device (for instance, in the case of a television, selecting channels or adjusting audio volume and the like) is either disabled or restricted. This sleep state may alternatively be referred to as a standby state or an idle state.

In addition, the device 2 receives remote control signals (transmitted as either an optical signal such as an infrared signal and the like, or as an electric signal such as that used by Bluetooth, wireless LAN and the like).

Figure 2:
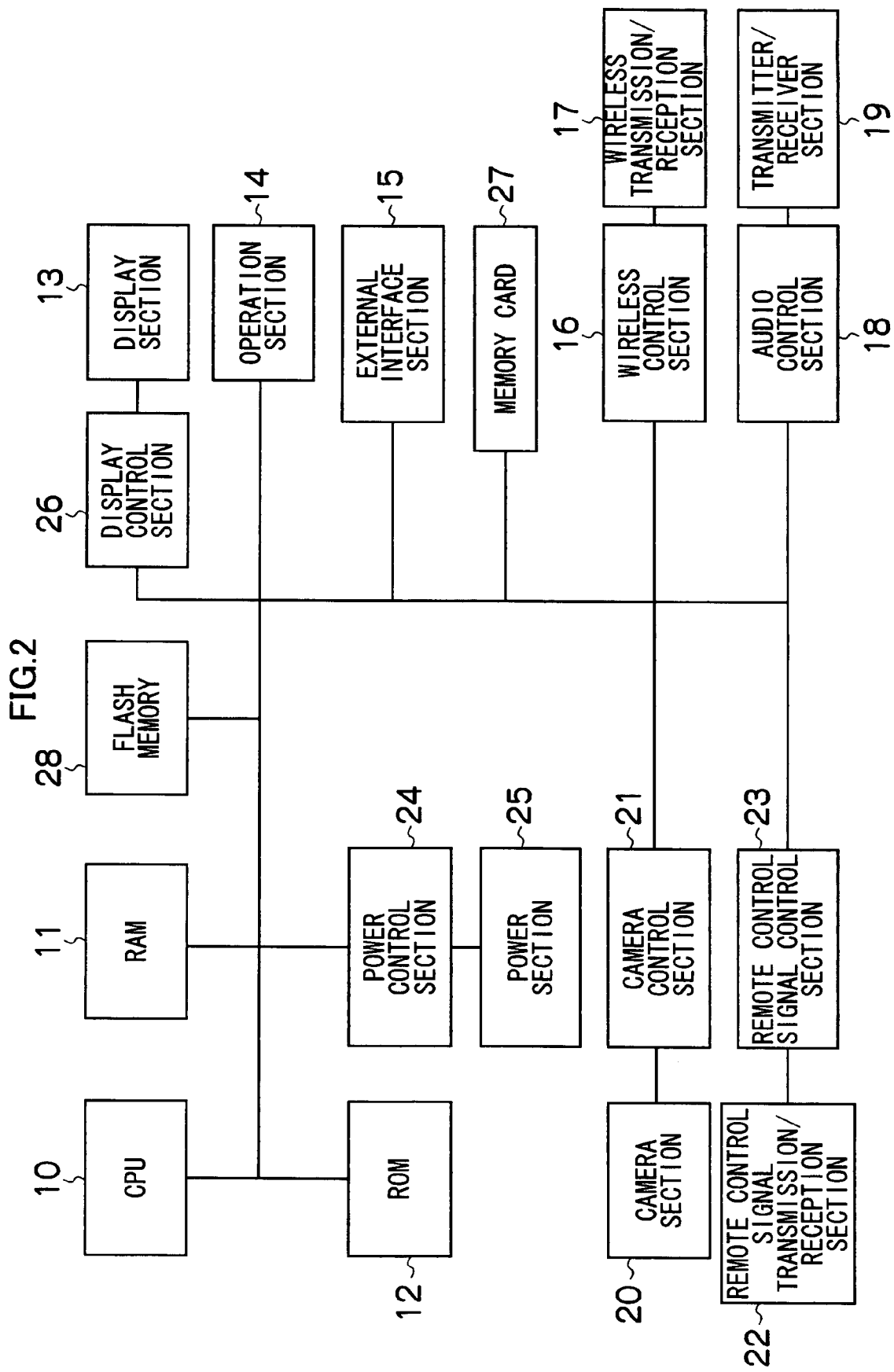
FIG. 2 is a configuration diagram of a remote control apparatus.

FIG. 2 is a functional block diagram of a remote control apparatus 1 according to a preferred embodiment of the present invention. The remote control apparatus 1 comprises: a camera section 20 that includes an image-taking lens, a solid-state image sensor such as a CMOS or a CCD, an analog front end circuit that processes an analog image read from the solid-state image sensor by a driver into a digital signal, a signal processing circuit such as a DSP (digital signal processor) or the like that processes a digital image signal from the analog front end circuit; a camera control section 21 that is configured by an one-chip microcomputer or the like and controls imaging operations of the camera section 20, and the like.

In addition, the remote control apparatus 1 comprises a display control section 26 that controls displaying on a display section 13 according to: input operations to an operating section 14 that is configured by a numerical keypad, a direction key or the like; various operation signals received by a remote control signal transmission/reception section 22 from an outside source; images and device-specific information acquired by the camera section 20, and the like.

The remote control apparatus 1 also comprises: a CPU 10 that supervises operation control of each section; a ROM 12 that stores various data and programs; and a RAM 11 that stores various data required by the CPU 10 to perform various processing.

In particular, the ROM 12 stores, for each of the existing devices 2, a control program that enables the CPU 10 to control a remote control signal control section 23 or a wireless control section 16 so that a remote control signal, on which a control code of the device 2 corresponding to an operation to the operating section 14 is superimposed, is transmitted, and also stores a remote control GUI that visually displays a relationship between an operation of each section of the operating section 14 and control codes superimposed by such operations.

For example, an optical double zoom lens is used as the image-taking lens, and the optical zoom magnification is changed by a motor driver forward and backward driving the image-taking lens to the telephotographic (tele) side or the wide-angle (wide) side in accordance with a magnification change operation inputted from the operation section 14. The magnification of the image-taking lens is not limited to the above. An aperture is provided for the image-taking lens. An appropriate amount of exposure is obtained by controlling the aperture via the motor driver.

When the photographing mode is set by the operation section 14, the CPU 10 displays a motion picture (live images) on the display section 13 to enable confirmation of the image-taking angle of field. That is, the solid-state image sensor converts a light of a subject which is incident through the image-taking lens and is formed on the light-receiving surface of the image sensor to an amount of signal charge corresponding to the amount of the light. The signal charges of respective pixels accumulated in this way are sequentially and individually read by the driver as voltage signals (image signals) corresponding to the signal charges, based on a driving pulse given by a timing generator in accordance with a direction from the CPU 10 and converted to digital signals in the analog front-end circuit, and each of them is added to the signal processing circuit.

The signal processing circuit includes a gain adjustment circuit and an A/D converter. It is an image processing device which includes a brightness/color difference signal generation circuit, a gamma correction circuit, a sharpness correction circuit, a contrast correction circuit, a white balance correction circuit, an outline processing section for performing imaging processing including outline correction for a taken image, a noise reduction processing section for performing noise reduction processing of an image and the like, and it processes an image signal in accordance with a command from the CPU 10.

The image data inputted into the signal processing circuit is converted to a brightness signal (Y signal) and a color difference signal (Cr/Cb signal), and the signals are stored in the VRAM after predetermined processings such as gamma correction is performed therefor.

When the monitor output of a taken image to the display section 13 is performed, a Y/C signal is read from the VRAM and sent to a display control section 26. The display control section 26 converts the inputted Y/C signal to a signal of a predetermined method for display (for example, a compound color picture signal of an NTSC method) and outputs it to the display section 13.

The Y/C signals of respective frames which have been processed at a predetermined frame rate are written in an A area and a B area of the VRAM alternatively, and a written Y/C signal is read not from the area in which a Y/C signal is being written but from the other area, between the A and B areas. By the Y/C signals in the VRAM being periodically overwritten, and picture signals generated from the Y/C signals being provided for the display section 13, the picture being taken is displayed on the display section 13 in real time. The user can confirm the image-taking angle of field by the picture (live images) displayed on the display section 13.

Here, when a photographing key provided on the operation section 14 is pressed, a photographing operation for storage is started. Image data acquired in response to the pressing of the photographing key is converted to a brightness/color difference signal (Y/C signal) in the signal processing circuit, and it is stored in the RAM 11 after predetermined processings such as gamma correction are performed therefor.

The Y/C signal stored in the RAM 11 is compressed in accordance with a predetermined format by a compression/expansion processing circuit and then stored in a memory card 27 as an image file in a predetermined format such as an Exif file. The image file can also be stored in a flash memory 28.

When the reproduction mode is set by the operation section 14, the compressed data of the final image file stored in the flash memory 28 (a file stored last) is read. When the file stored last is a still image file, the read compressed image data is expanded to an uncompressed Y/C signal via the compression/expansion processing circuit and stored in the VRAM. The Y/C signal stored in the VRAM is added to the display control section 26. The display control section 26 creates a compound RGB color picture signal of the NTSC method from the inputted Y/C signal and outputs it to the display section 13. Thereby, the frame image of the last frame stored in the memory card 27 is displayed on the display section 13.

After that, when the right key of a cross key provided on the operation section 14 is pressed, frame advancing is performed in the forward direction, and when the left key of the cross key is pressed, frame returning is performed in the opposite direction. Then, an image file at the frame position set by the frame advancing or returning is read from the memory card 27, and a frame image is reproduced on the display section 13 similarly as described above. If frame advancing is performed in the forward direction when the frame image of the last frame is displayed, the image file of the first frame stored in the memory card 27 is read, and the frame image of the first frame is reproduced on the display section 13.

The number of pixels of an image file to be stored is, for example, any of 2832×2128 (6 M), 2048×1536 (3 M), 1280×960 (1 M) and 640×480 (VGA), and the amount of data of a taken image (the file size) changes according to the combination of the stored image quality and the number of stored pixels.

The remote control apparatus 1 may be configured by a camera-equipped mobile phone or a digital camera, as described in the above-identified non-patent document. However, the block (the memory card 27 or the flash memory 28) related to recording and storing images is not essential to the present embodiment.

The remote control signal transmission/reception section 22 comprises a light receiving element. Although FIG. 2 shows the camera section 20 and the remote control signal transmission/reception section 22 as separate components, the light receiving element actually doubles as the solid-state image sensor of the camera section 20. Therefore, by having the camera section 20 capture images using the devices 2 as subjects, device-specific information optically transmitted by each device 2 may be acquired along with the image.

The remote control signal control section 23 converts device-specific information superimposed on an optical signal incident to the remote control transmission/reception section 22 from an external device 2 into digital data, and outputs the same to the CPU 10.

In response to device-specific information inputted from the remote control signal control section 23, the CPU 10 reads out a table defining control codes specific to the devices 2 identified by the device-specific information from the ROM 12 to the RAM 11. The CPU 10 then reads out a control code specific to the device 2 specified by the device-specific information from the RAM 11 in response to an operation specifying desired device-specific information on the display section 13 from the operating section 14, and transmits the control code to the remote control signal control section 23.

The remote control transmission/reception section 22 comprises an optical signal transmission device including a light-emitting diode and an infrared LED or the like. The remote control signal control section 23 transmits an optical signal that is superimposed with the control code and other data instructed by the CPU 10 to the specified device 2. As seen, remote control of the device 2 is achieved by transmitting optical control signals from the remote control apparatus 1 to the specified device 2.

In addition, the remote control apparatus 1 comprises: a wireless transmission/reception section 17 that transmits to and receives from the device 2 wireless signals such as mobile communication waves and signals used in IrDA, Bluetooth, wireless LAN, wireless USB and the like; a wireless control section 16 that converts received wireless signals into data and transmits the same to the CPU 10, or superimposes remote control signals instructed by the CPU 10 onto wireless signals; and an external interface section 15 that communicates with various electrical home appliances 2 such as a personal computer, a printer and the like, according to a standard such as USB or the like.

The CPU 10 may also read out a control code specific to a device 2 corresponding to operations of the operating section 14 from the RAM 11, and transmit the control code to the wireless control section 16. The wireless control section 16 transmits a wireless signal that is superimposed with the control code and other data inputted from the CPU 10 to the device 2. The wireless signal reaches the device 2 via a LAN or an external network. Upon receiving the control code, the device 2 performs operation in accordance with the control code. As seen, remote control of a specific device 2 by the operating section 14 may also be achieved by transmitting a wireless signal from the remote control apparatus 1 to the device 2.

The remote control apparatus 1 comprises: a transmitter/receiver section 19 that includes a sound amplification device, such as a loudspeaker, that emits sound, and a receiving device, such as a microphone, that converts received sound into electrical signals; and an audio control section 18 that controls the contents of speech of the sound amplification device. The audio control section 18 is provided with a function for identifying a specific audio pattern specified by the CPU 10 from an audio signal inputted from the transmitter/receiver section 19.

The CPU 10 may also read out a control code of a specific device 2 corresponding to audio received by the transmitter/receiver section 19 from the RAM 11, and transmit the control code to the remote control signal control section 23 or the wireless control section 16. In other words, specification of a control code transmitted by means of either an optical signal or a wireless signal to a specific device 2 is not limited to input operations to the operating section 14, and may instead be performed by audio input.

Additionally, in response to an input operation to the operating section 14 or an audio input to the transmitter/receiver section 19, the CPU 10 selects whether the control code will be transmitted from the remote control signal transmission/reception section 22 or from the wireless transmission/reception section 17. If the remote control apparatus 1 is in the presence of the device 2 to be controlled, the control code may simply be transmitted from the remote control signal transmission/reception section 22. If not, the user instructs the CPU 10 by means of an input operation to the operating section 14 or an audio input to the transmitter/receiver section 19 that the control code will be transmitted from the wireless transmission/reception section 17. In response to this instruction, the CPU 10 performs control so that the control code is transmitted from the wireless transmission/reception section 17.

Figure 3:
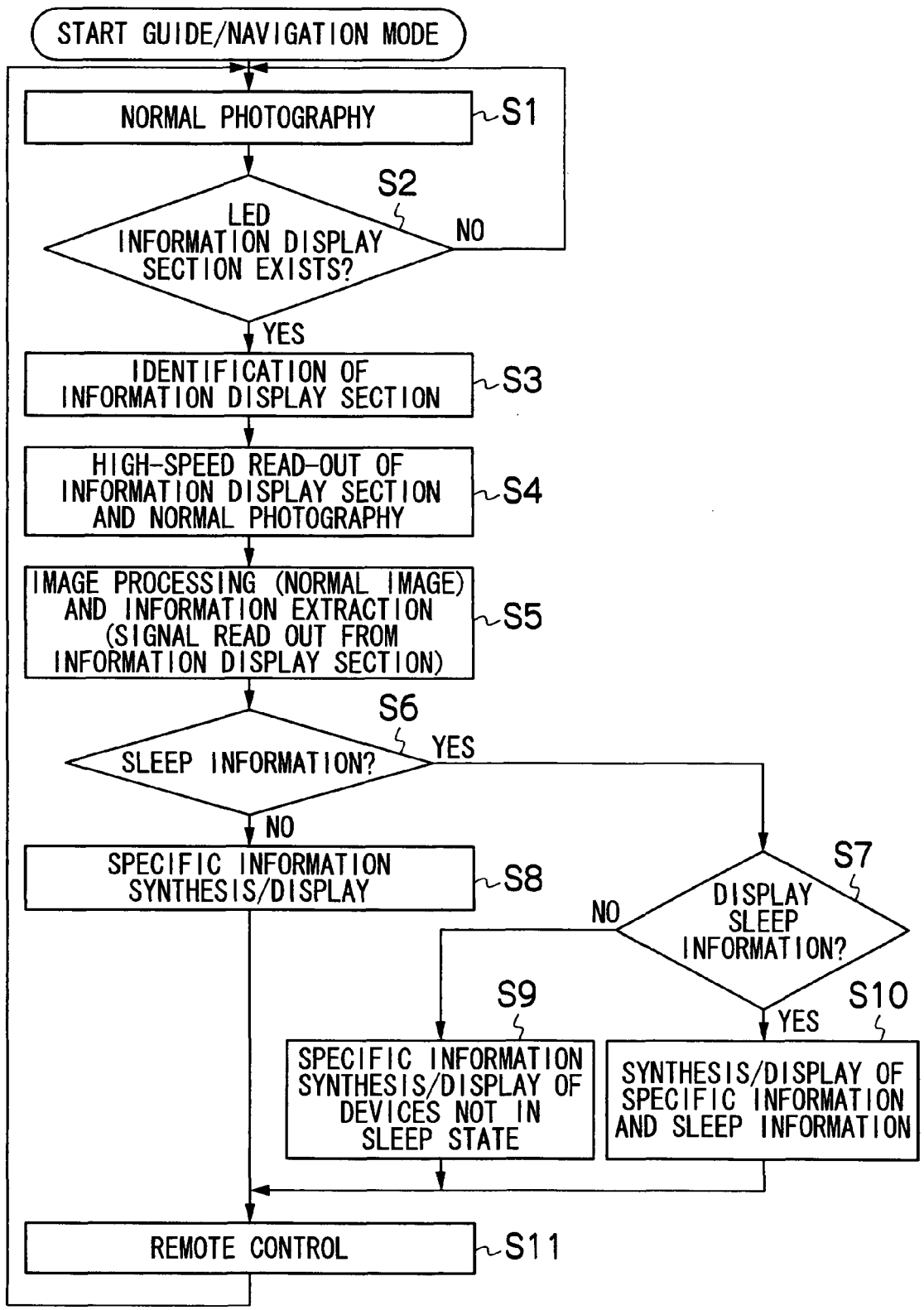
FIG. 3 is a flowchart showing a flow of remote control processing.

FIG. 3 is a flowchart showing a flow of remote control processing that is performed by the remote control apparatus 1.

First, in S1, the CPU 10 instructs the camera control section 21 to commence a still image acquisition operation in response to an imaging instruction inputted to the operating section 14 or the transmitter/receiver section 19. The camera control section 21 acquires a still image by controlling the camera section 20, and stores the still image into the RAM 11.

In S2, the CPU 10 determines whether at least one pilot signal has been detected from the image acquired from the camera section 20. When it is determined that at least one pilot signal has been detected, the process proceeds to S3. If no pilot signal has been detected, the process returns to S1.

In S3, the CPU 10 identifies an information transmission position based on a detected position of the pilot signal.

In S4, the CPU 10 once again performs a still image acquisition operation at a high frame rate for the portion that is the information transmission position and at a low frame rate for other portions.

In S5, the CPU 10 displays a live view of the acquired still image onto the display section 13, and at the same time extracts superimposed information (either only device-specific information, or both device-specific information and sleep information).

In S6, the CPU 10 determines whether the extracted information includes sleep information. If sleep information is included, the process proceeds to S7, and if not, the process proceeds to S8.

In S7, according to a user operation inputted to the operating section 14, the CPU 10 selects whether sleep information should be displayed. In the event that sleep information will be displayed, the process proceeds to S10. If not, the process proceeds to S9. Selection of whether sleep information will be displayed may either be arranged to be performed at each device 2, or arranged to be uniformly performed.

In S8, the CPU 10 synthesizes the extracted device-specific information onto the vicinity of the information transmission position of each device 2 in the still image, and arranges the information to be displayed on the display section 13.

In S9, among the extracted device-specific information, the CPU 10 synthesizes device-specific information of devices 2 that are not transmitting sleep information onto the vicinity of the information transmission position of each device 2 in the still image, and arranges the information to be displayed on the display section 13.

In S10, the CPU 10 synthesizes the extracted device-specific information onto the vicinity of the information transmission position of each device 2 in the still image, and arranges the information to be displayed on the display section 13. At the same time, the CPU 10 synthesizes sleep information and device-specific information onto the vicinity of the information transmission position of the devices 2 that have transmitted sleep information in the still image, and arranges the information to be displayed on the display section 13.

In S11, the CPU 10 transmits a remote control signal that includes a desired control code selected via the operating section 14 to a desired device 2 for which device-specific information has been selected on the display section 13 by the operating section 14.

Figure 4:
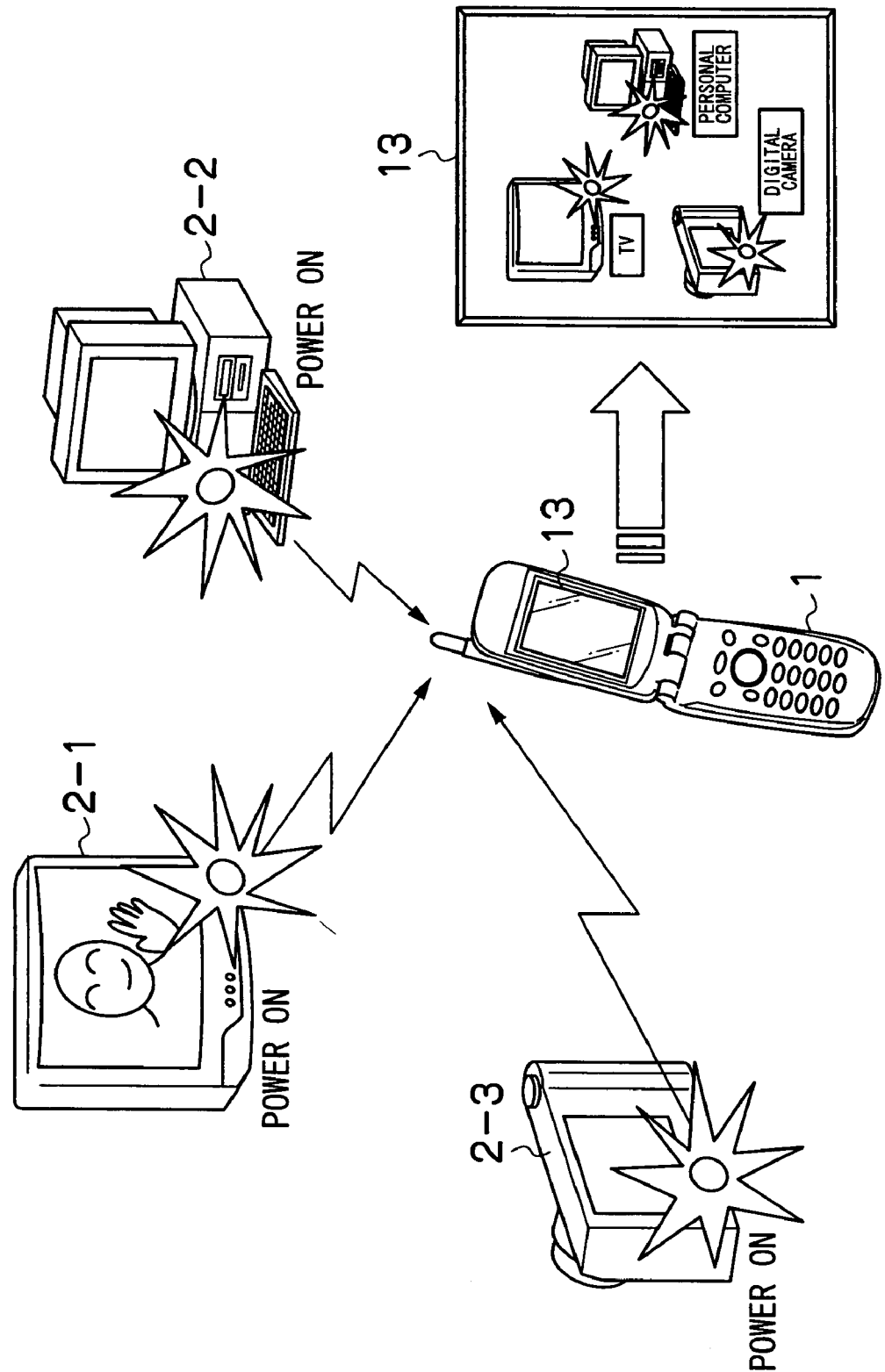
FIG. 4 is a diagram showing a state in which specific information is superimposed on a still image in which the subject is a device in a power-on state.
Figure 5:
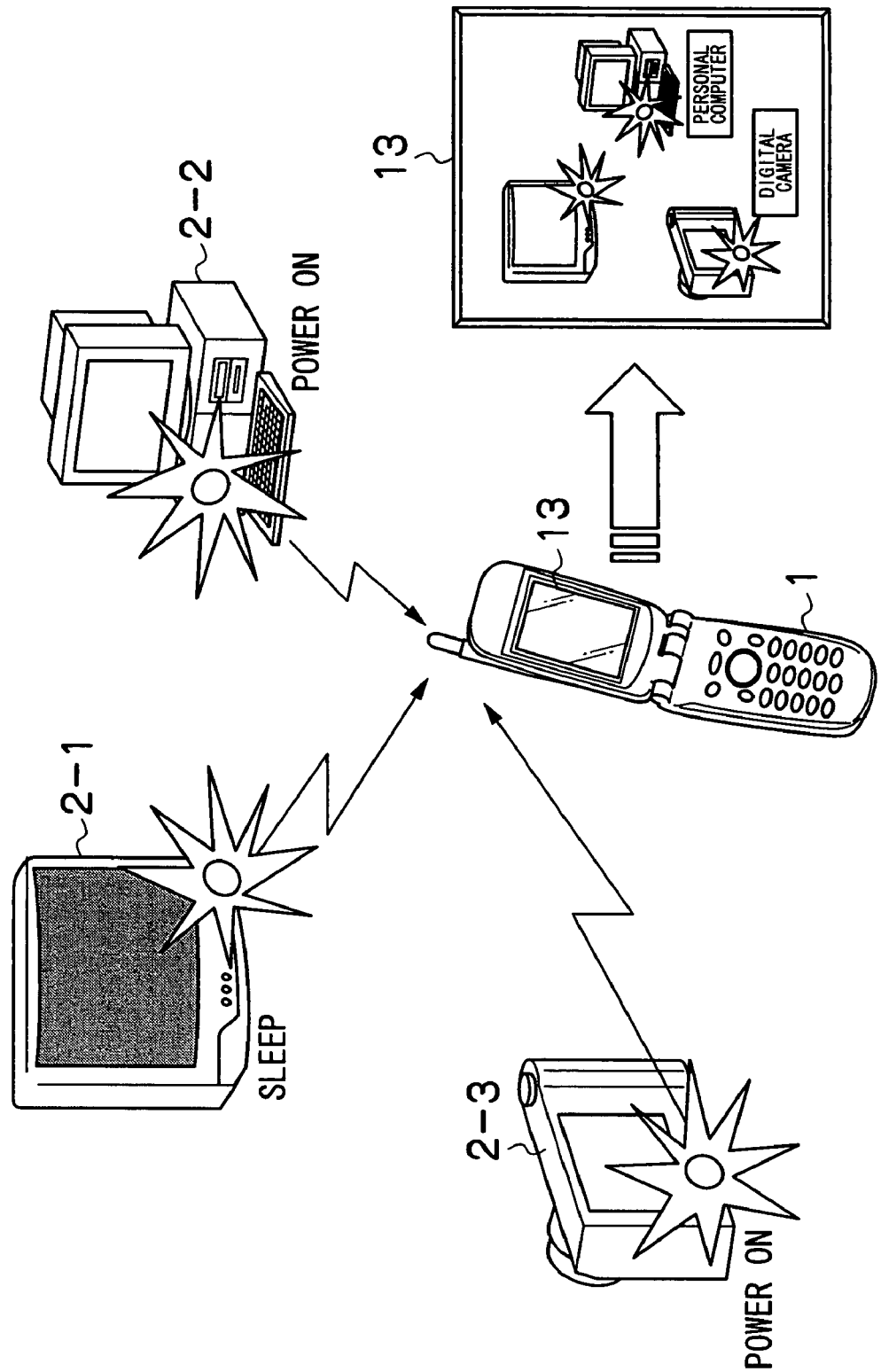
FIG. 5 is a diagram showing a state in which specific information is not superimposed on a still image in which the subject is a device in a sleep state.
Figure 6:
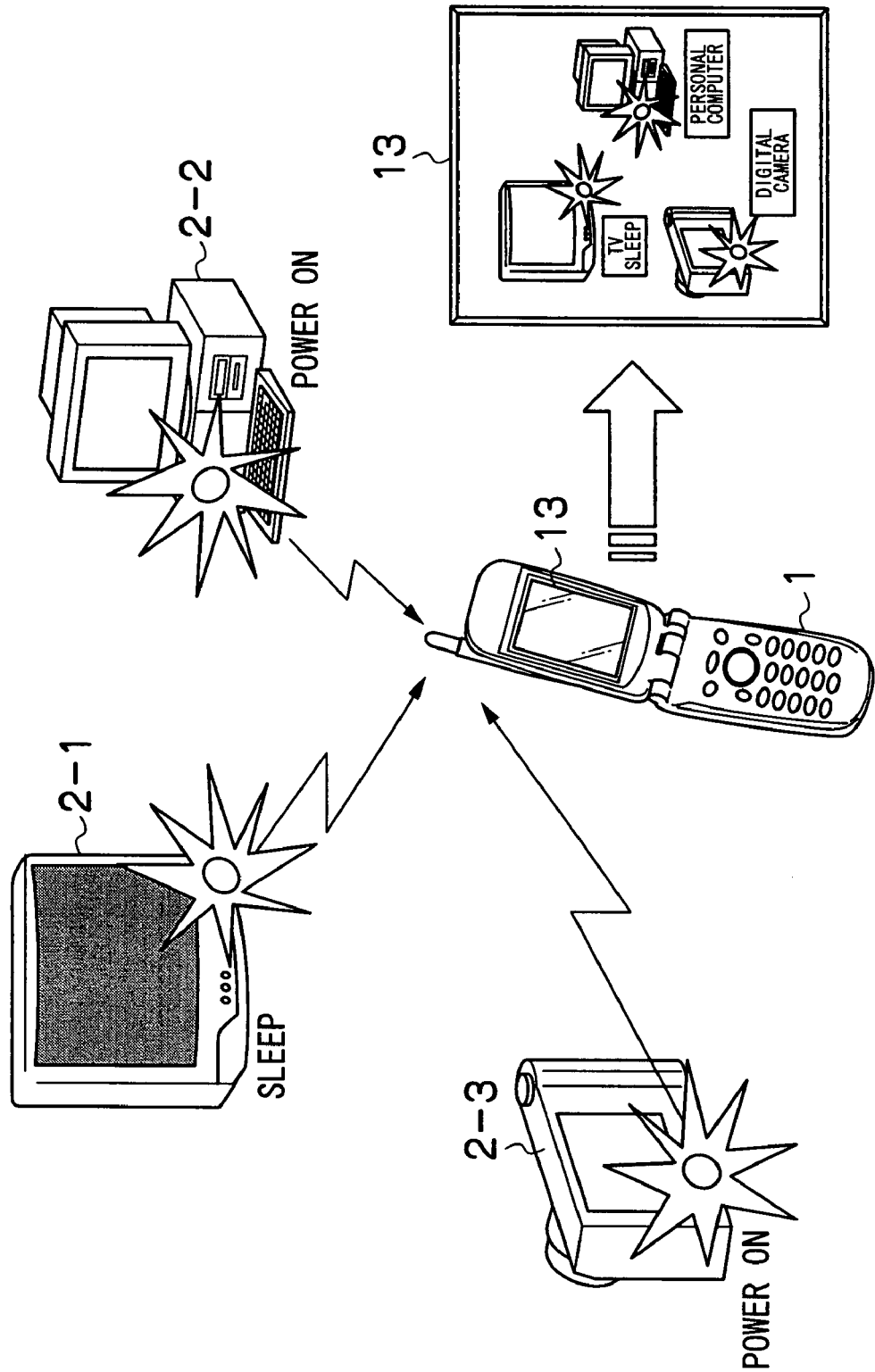
FIG. 6 is a diagram showing a state in which sleep information is superimposed on a still image in which the subject is a device in a sleep state.

FIGS. 4 to 6 illustrate display states of the display section 13 based on the operations described above.

FIG. 4 shows an example of a live view in the event that a still image is acquired using devices 2-1, 2-2 and 2-3, which are respectively turned on, as subjects. In this case, since a television 2-1, a personal computer 2-2 and a digital camera 2-3 are respectively turned on, and none have transmitted sleep information, specific information of each device 2 is synthesized onto and displayed at a vicinity of an information transmission position of the still image in which each device 2 is a subject.

FIG. 5 shows an example of a live view in the event that the device 2-1 has transmitted sleep information. In this case, since the personal computer 2-2 and the digital camera 2-3 are respectively turned on and neither has transmitted sleep information, specific information of the devices 2-2 and 2-3 is synthesized onto and displayed at a vicinity of respective information transmission position of the still image. On the other hand, since the television 2-1 has transmitted sleep information, specific information of the device 2-1 will not be synthesized onto a vicinity of the information transmission position of the device 2-1.

FIG. 6 shows an example of a live view in the event that the device 2-1 has transmitted sleep information, and at the same time an instruction to display the sleep information has been issued by the operating section 14. In this case, specific information is also displayed for the device 2-1 that is in a sleep state. In addition, since sleep information is also displayed, it may be easily acknowledged that the device 2-1 is in a sleep state.

As described above, since the remote control apparatus 1 suspends displaying of device-specific information to be suspended in accordance to reception of sleep information from the device 2, the risk of remote control being impeded by device-specific information displayed in an indiscriminant and disordered manner may be reduced, and efficient remote control operations may be achieved.

In addition, if necessary, the operating section 14 may be operated on a case-by-case basis to have specific information or sleep information of a device 2 in a sleep state to be displayed as well.

What is claimed is:

1. A remote control apparatus, comprising:
an acquisition section that continually acquires, by an imaging element, an image in which a subject thereof comprises a remote control target device, information specific to the device that is optically transmitted from the device, and state information of the device;
a display section that superimposes the image with the information specific to the device continually acquired by the acquisition section and displays the superimposed image;
an instruction acceptance section that accepts, from a user, instructions regarding a selection of information specific to a desired remote control target device among devices for which the information specific to the device has been acquired and a selection of desired control contents regarding the device for which the information specific to the device has been selected;
a remote control section that transmits a remote control signal corresponding to the desired control contents selected at the instruction acceptance section to a device for which the information specific to the device has been selected at the instruction acceptance section; and
a display control section that controls the display section to suspend superposition/display of the information specific to the device onto the image according to the state information of the device continually acquired by the acquisition section, said state information of the device comprising sleep information of the device.

2. The remote control apparatus according to claim 1, wherein the display control section commences the suspended superposition/display of the information specific to the device in a response to an instruction to the instruction acceptance section.

3. The remote control apparatus according to claim 2, wherein the sleep information of the device includes information indicating that control of original operations of the devices is restricted.

4. The remote control apparatus according to claim 1, wherein the sleep information of the device includes information indicating that control of original operations of the devices is restricted.

5. The remote control apparatus according to claim 1, wherein the sleep information of the device comprises information on the device when the device is substantially inoperable.

6. The remote control apparatus according to claim 1, wherein the sleep information of the device comprises information indicating that control of original operations of the device is one of disabled and restricted.

7. The remote control apparatus according to claim 1, wherein in a sleep state, the device superimposes the sleep information indicating that the device is in the sleep state in addition to the information specific to the device.

8. The remote control apparatus according to claim 7, wherein the sleep state comprises a standby state.

9. The remote control apparatus according to claim 7, wherein the sleep state comprises an idle state.

10. The remote control apparatus according to claim 7, wherein in the sleep state minimal functions required for activating the device are operational, and control of original operations of the device is one of disabled and restricted.

11. The remote control apparatus according to claim 1, wherein the display section displays the sleep information and the information specific to the device.

12. The remote control apparatus according to claim 1, wherein in a sleep state, the device continually transmits to the acquisition section the sleep information indicating that the device is in the sleep state and the information specific to the device.

13. A remote control system, comprising:
a device that optically transmits specific information and state information;
an acquisition section that continually acquires, by an imaging element, an image in which a subject thereof comprises the device, information specific to the device that is optically transmitted from the device, and the state information of the device;
a display section that superimposes the image with the information specific to the device continually acquired by the acquisition section and displays the superimposed image;
an instruction acceptance section that accepts, from a user, instructions regarding a selection of information specific to a desired remote control target device among devices for which the information specific to the device has been acquired and a selection of desired control contents regarding the device for which the information specific to the device has been selected;
a remote control section that transmits a remote control signal corresponding to the desired control contents selected at the instruction acceptance section to a device for which the information specific to the device has been selected at the instruction acceptance section; and
a display control section that controls the display section to suspend superposition/display of the device-specific information onto the image according to the state information of the device continually acquired by the acquisition section, said state information of the device comprising sleep information of the device.

14. A device-specific information display method, comprising:
continually acquiring, by an imaging element, an image in which a subject thereof comprises a remote control target device, information specific to the device that is optically transmitted from the device, and state information of the device;
superimposing the image with the information specific to the device continually acquired by the imaging element and displaying the superimposed image; and
controlling the displaying to suspend superposition/display of the information specific to the device onto the image according to the state information of the device continually acquired, said state information of the device comprising sleep information of the device.

* * * * *